Jan. 11, 1927.    R. L. WOODRUFF    1,614,269
COTTON DUSTER
Filed March 31, 1926    3 Sheets-Sheet 1
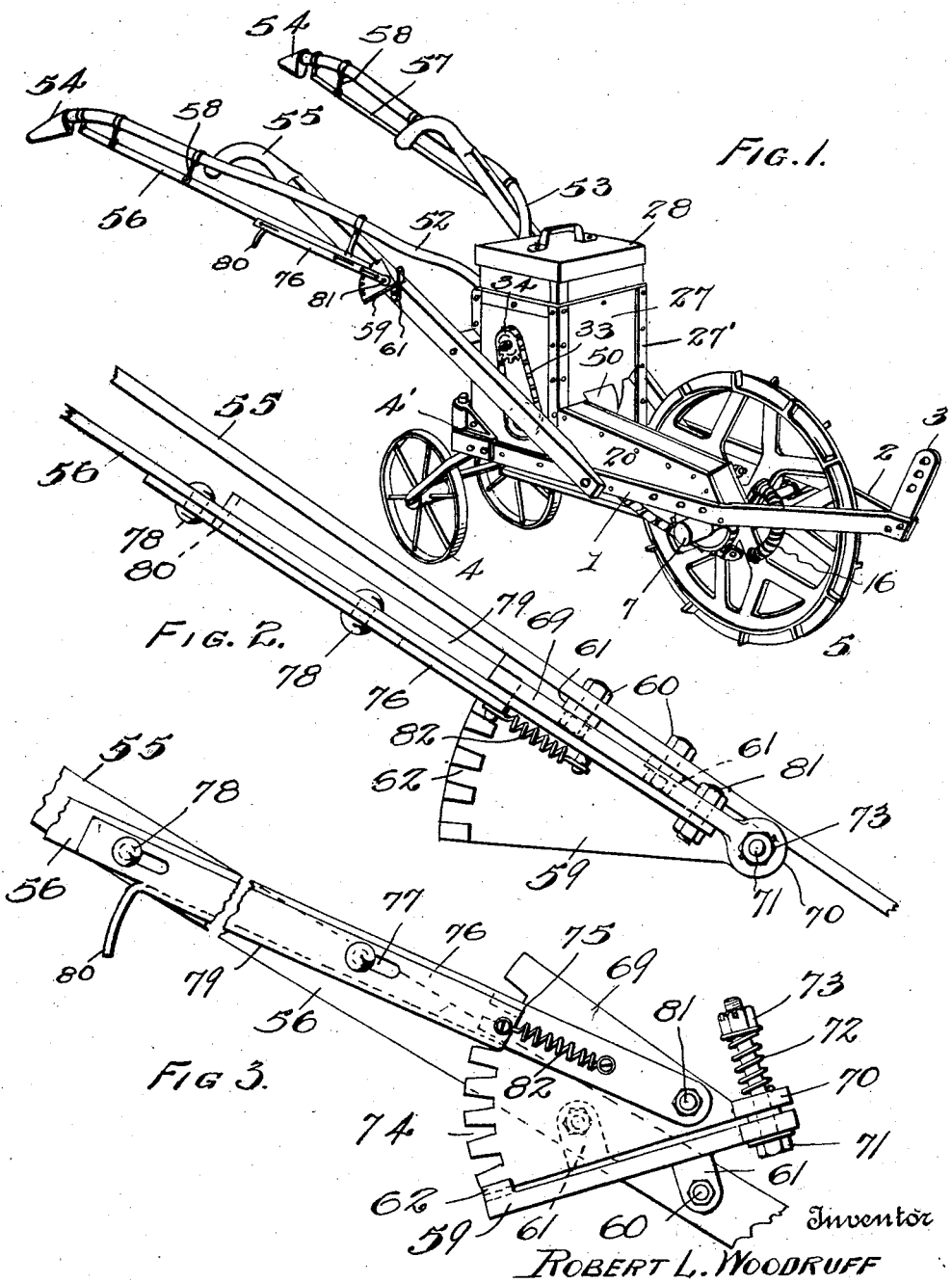

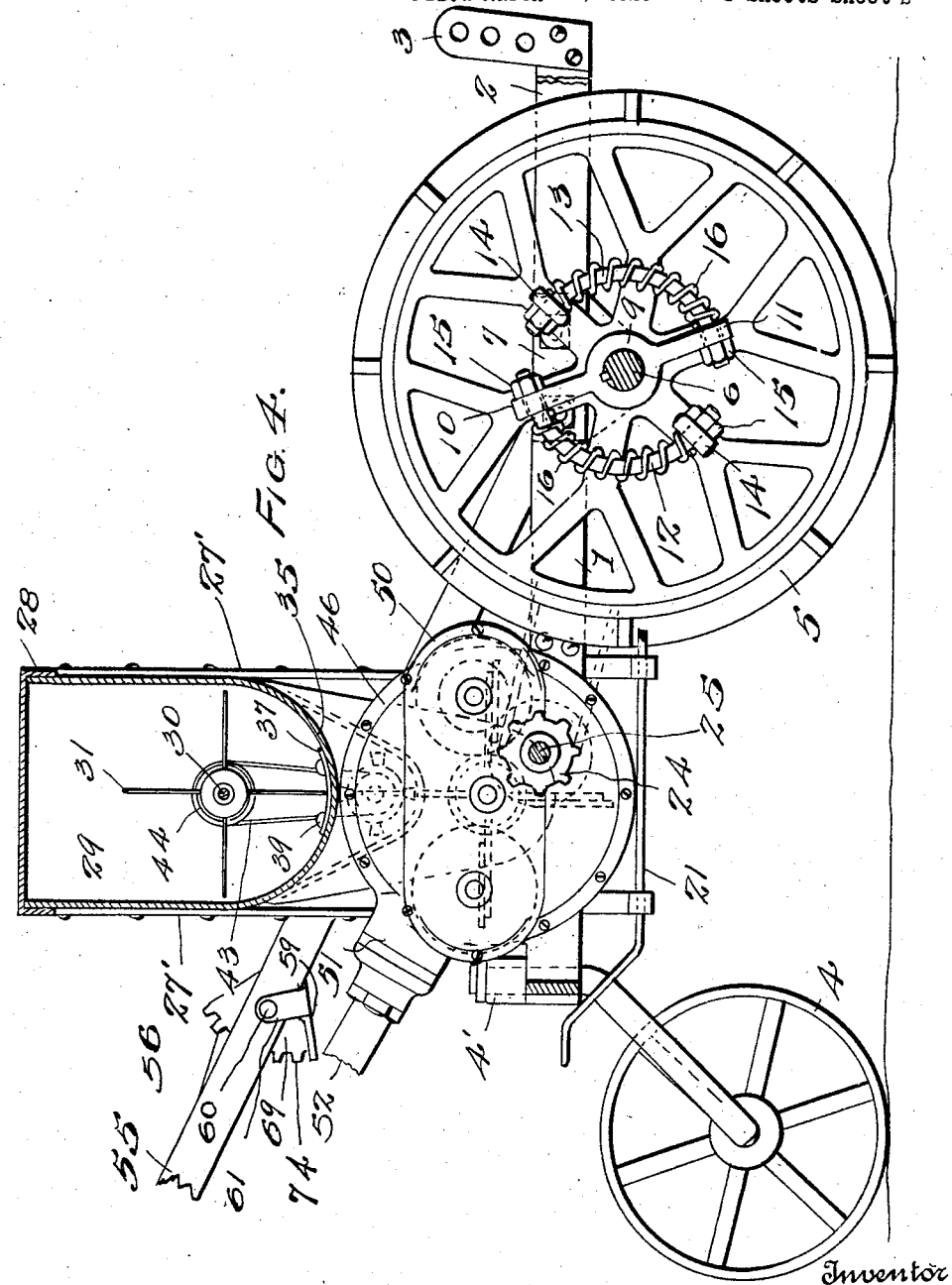

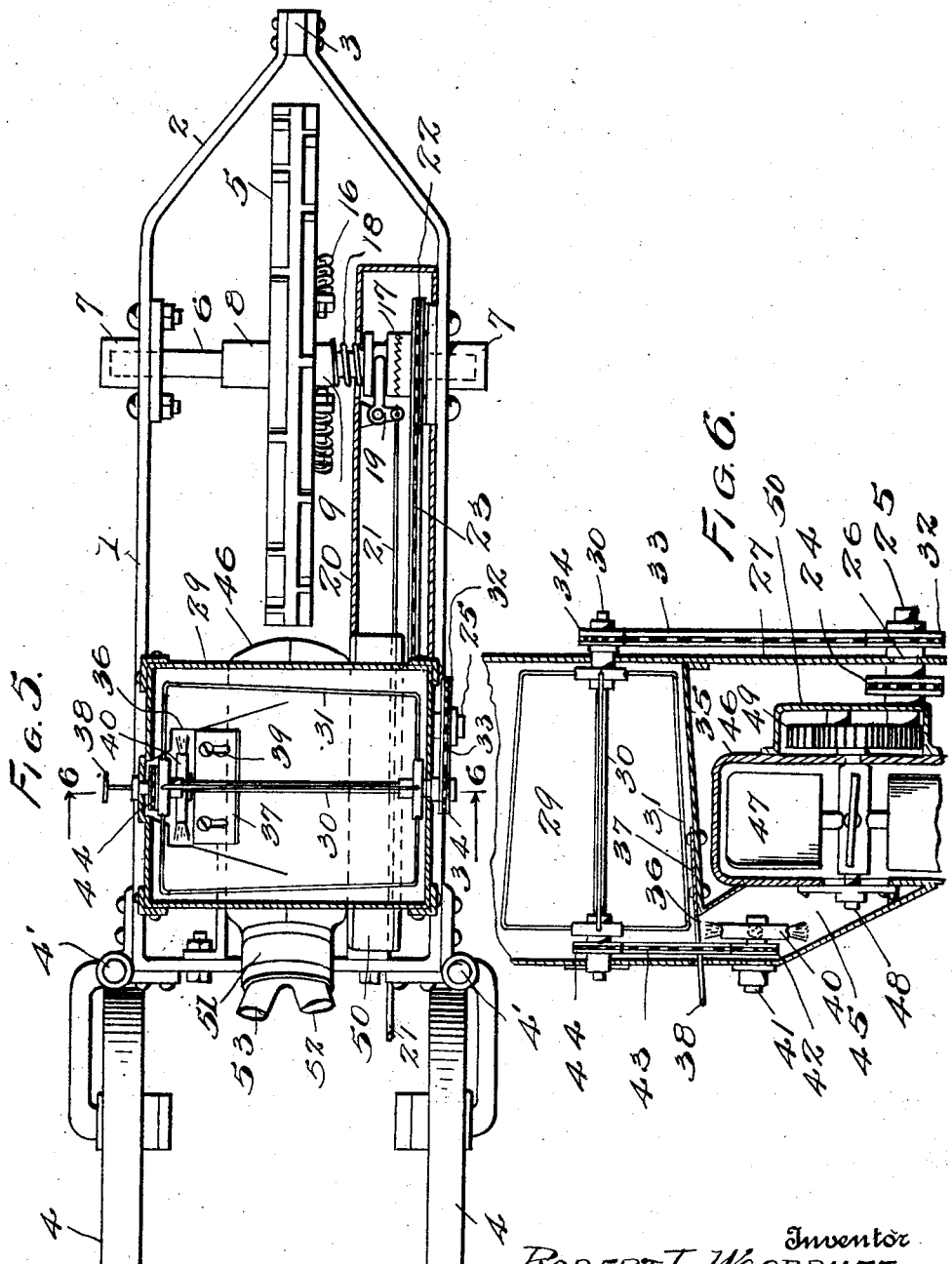

Patented Jan. 11, 1927.

1,614,269

UNITED STATES PATENT OFFICE.

ROBERT LEE WOODRUFF, OF WINDER, GEORGIA.

COTTON DUSTER.

Application filed March 31, 1926. Serial No. 98,836.

The present invention relates to improvements in cotton dusters adapted especially for applying powder, as calcium arsenate, simultaneously to two rows of standing cotton. The duster or dusting machine is preferably horse drawn, and utilizes driving mechanism actuated from its front traction wheel for operating a fan blower, which forces the fine powder through duplex tubes, and the powder is discharged from the tubes through discharge nozzles located at their rear ends. Means are provided for supplying the powder, agitating it, and delivering the powder to the fan blower, and means are provided for adjusting the height of the nozzles as well as for relatively adjusting the nozzles in lateral position. Resilient coupling means are employed in connection with the driving wheel to cushion its operation in starting the driving and operating mechanisms, and the machine is also equipped with other devices for assuring a smooth working and reliable implement which performs its functions efficiently and in an economical manner.

The invention consists in certain novel combinations and arrangements of parts as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1 is a perspective view of a cotton duster in which the improvements of my invention are embodied.

Figure 2 is a top plan view of one of the duplex control devices for adjusting the tubes and nozzles, one located at each side of the machine or implement.

Figure 3 is a view in side elevation of the control device.

Figure 4 is a longitudinal vertical sectional view of the implement.

Figure 5 is a partial plan and partial horizontal sectional view of the implement.

Figure 6 is a transverse vertical sectional view at line 6—6 of Figure 5.

As herein illustrated the implement is of the horse-drawn type and of a size to readily pass along between two rows of standing cotton in order that the powder may be sprayed or blown to the rear as the implement advances for treatment of the cotton plants. In carrying out my invention I preferably use a main frame 1 of approximately rectangular shape and provided with converging front bars 2 between which the clevis bar 3 is rigidly secured for attaching the draft harness of the horse.

At the rear of the implement two caster wheels 4, 4, are supported in swivel bearings 4' in order that the implement may readily be guided and kept in proper line. A larger, single front wheel 5 located at the longitudinal center of the implement is used as the driving wheel for the operating parts of the implement. The drive wheel is loosely journaled on the axle 6 and the latter is journaled in bearing blocks 7 attached to the main frame 1. The hub 8 of the wheel is loose on its axle and adjacent to this hub is an auxiliary hub 9 keyed on the axle and provided with radiating arms 10 and 11. Semi-circular shaped bolts 12 and 13 are carried in these arms and in perforated lugs 14 fixed to the spokes of the wheel. Each bolt has its ends passing through a lug and the end of an arm, and securing nuts 15 are employed on the extremities of the bolts to retain the bolts within their supports. The bolts are loose in their supports and each bolt is provided with a coiled spring 16 interposed between an arm and a lug. Thus the shock or jar of starting the drive wheel is absorbed by the springs before the jar can be transmitted to the axle and a cushioning effect is produced when the driving mechanism is initially actuated by movement of the drive wheel.

A driving clutch 17 is carried by the axle and the usual clutch spring 18 and clutch yoke 19 are utilized, the latter being pivoted in a housing 20 which is attached to the frame.

The clutch is manually controlled by the use of the rod 21 which extends to the rear of the implement for the convenience of the driver and may be pulled to engage the clutch and pushed to disengage the clutch as for instance when turning at the end of a row preparatory to entrance between another pair of rows for spraying, or when the implement is being transported from place to place and operating of the machine is undesirable.

Power is transmitted from the driving axle through a drive sprocket 22 thereon and a chain 23 which latter passes over a driven sprocket wheel 24 on the operating shaft 25 which is journaled transversely of the implement in suitable bearings 26, at the rear of the driving wheel.

A box 27, preferably of rectangular shape is supported in suitable manner, as by corner posts 27' above the main frame and provided with a lid or cover 28 which is removable for supplying the powder to the interior hopper or chamber 29 located in the upper part of the box.

Within the hopper a rotary agitator is employed for continuously stirring and mixing the powder to prevent clogging and uniformly distribute the powder. This rotary agitator comprises a reel having a spider frame of wire, and which is rotatable with the agitator shaft 30 journaled transversely of the box in its side walls. The rotary reel includes four wires 31 which are fashioned to form a tapering wire spider-frame and this frame is rotated by means of the sprocket wheel 32 on the operating shaft 25, chain 33, and sprocket wheel 34 on the agitator shaft, the sprocket mechanism as shown being located on the exterior of the box.

Preferably the hopper is fashioned with a laterally declining bottom 35 with which the rotary agitator co-operates to convey the powder toward an outlet opening 36 at one side of the bottom, and this outlet opening is regulated as to its size by means of the slotted slide plate 37 that is controlled by means of a handle as 38 extending to the exterior of the box. Screws or bolts as 39 are employed in connection with the slotted slide plate for guiding it and retaining it in proper position for controlling the size of the dischagre opening or outlet 36 for the powder.

Just below the outlet 36 another rotary agitator in the form of a brush 40 is located for the purpose of maintaining the powder in suspension. This rotary brush is fixed to revolve with its shaft 41 journaled in suitable bearings of the box and a sprocket wheel 42 on shaft 41 is provided with a chain 43 that passes over a sprocket wheel 44 on the agitator shaft 30 to transmit power to the rotary brush.

From the discharge opening 36 of the hopper and while under agitation from the brush 40 the powder is drawn by suction through the intake pipe 45 to a fan casing 46 located below the hopper and supported from the main frame in suitable manner.

Within the casing a fan 47 and its shaft 48 are journaled, and the fan is propelled at high speed through the use of suitable gearing indicated at 49 and located within the gear case 50 attached at one side of the fan casing. The gearing is used to transmit power between the operating shaft 25 and the fan shaft and the fan is thus driven at high speed to draw the dust or powder through its intake opening at the center of the casing and force the air and dust under pressure through the peripheral outlet opening 51 from the fan casing.

Two dust-conveying tubes 52 and 53 are coupled to the outlet from the fan casing at the rear of the casing and these tubes, which extend rearwardly from the hopper or box and diverge, and provided with end nozzles 54 for spraying the dust or powder to the cotton plants. The tubes are located along the outer sides of the implement handles 55 fashioned similar to plow handles and attached to the main frame of the implement for manipulating or guiding the implement as it advance between the two rows of cotton.

The conveyors or tubes are supported from the handles by means of supporting bars 56 and 57 respectively and brackets 58 are located at proper intervals on the supporting bars to maintain the tubes in proper position. The two supporting bars 56 and 57 are pivotally supported from their respective handles in such manner that they may be adjusted both vertically and laterally with relation to the handles for the purpose of adjusting the nozzles of the respective tubes with relation to the cotton to be dusted.

Inasmuch as the adjusting devices for the two tubes are of similar construction and operation, a description of the construction and operation of one will apply to both devices.

A segmental-shaped casting or plate 59 is secured to the handle by bolts 60 that pass through upper and lower lugs 61, 61 to hold the segmental plate in position at a slight angle to the horizontal. The circular periphery of the segmental plate is fashioned with a series of notches 62 on its upper face and a similar segmental plate 69 disposed at right angles to plate 59 is adapted to co-act with these notches. The plate 69 is fashioned with a perforated lug 70 located in a plane at right angles to the plate and through this lug the plate is pivoted on an upright bolt 71 having a spring 72 thereon, and an adjusting nut 73 above the spring may be used to vary the tension of the spring for holding the plate 69 with relation to the plate 59.

The plate 69 has at its periphery a series of teeth 74 with which a ratchet 75, on the end of the ratchet bar 76, co-acts. The ratchet bar is slotted as at 77 and bolts or rivets 78 rigid with the arm or supporting bar 56 retain the ratchet bar with relation to its supporting arm. The ratchet bar is also fashioned with a retaining flange 79 fitted under the under edge of the bar 56, and a handle 80 is fashioned on the ratchet bar. The supporting bar 56 is pivoted on the handle 55 at 81, and a spring 82 is attached to the ratchet bar and to supporting bar 56 to hold the ratchet bar in position. To adjust the supporting bar 56 and tube 52 vertically the ratchet bar is pulled to the left in Figure 3 to disengage the ratchet 75 from the teeth 74 of plate 69 and the supporting bar may then be swung on its pivot 81 and latched in desired position.

To adjust the supporting bar 56 and tube 52 laterally, i. e., swing the nozzle 54 to the right or left, the bar 76 is retained in latched position and with the supporting bar 56 is swung upwardly on pivot 81 to release plate 69 from the notch 62 of plate 59. The supporting bar, ratchet bar and plate 69 may then be swung on the bolt 71 as a center and when the desired position is reached the plate 69 is dropped into a selected notch 62 of the plate 59.

The implement as thus constructed and operated is designed to insure smooth working of its parts, to withstand hard usage and service, and because of the operation of the fan blower and agitators the powder is lofted into fine dust and sprayed from the nozzles to the plants in small clouds that uniformly envelop the plants and distribute the treatment to all necessary parts of the plants.

Among the most important features of my invention may be mentioned the adjusting devices for the pair of distributing tubes, such devices being located adjacent the handles of the machine and capable of ready manipulation by the attendant to move said tubes either vertically or horizontally to direct the powder in the most advantageous way upon the plants. Also a most important feature of my invention resides in the construction of the powder container mounted in the hopper and having the inclined wall with outlet and adjustable slide and the main stirrer or agitator which acts to give the powder a primary mixing or breaking up while below said outlet is placed the rapidly revolving brush-like agitator which acts upon the powder as it leaves the outlet and gives it a second agitation to produce very fine particles ready to be acted upon by the fan for delivering the powder to the distributing tubes, thus insuring the highest degree of efficiency.

Having thus fully described my invention, what I claim as new and desire to secure by Letters Patent is—

1. A cotton duster, consisting of an open rectangular frame, a pair of ground wheels mounted at the rear of said frame, a driving traction wheel mounted in the front of the frame and movable on its axle, an auxiliary hub fixed on the axle of the driving wheel, resilient cushioning means between said hub and wheel, driving mechanism actuated from said axle, a clutch associated with said driving mechanism, manually operated means associated with said clutch, operating mechanism actuated from the driving mechanism, a hopper mounted in the open frame and having an inclined bottom provided with an outlet and forming a powder receptacle, an adjustable slide for controlling said outlet, an agitator mounted in said hopper and conforming to the shape thereof, a secondary agitator disposed immediately below the first named agitator and the outlet in the bottom of the hopper, a fan casing disposed in the lower portion of said hopper, a fan blower mounted in said casing, gearing for rapidly rotating said fan blower, means for driving the agitators and fan blower, distributing pipes leading from the fan casing and having nozzles disposed in proximity to the handles of the machine, and means for adjusting said handles laterally and vertically.

2. A cotton duster, consisting of an open rectangular frame, a pair of ground wheels mounted at the rear of said frame, a driving traction wheel mounted in the front of the frame and movable on its axle, an auxiliary hub fixed on the axle of the driving wheel, resilient cushioning means between said hub and wheel, driving mechanism actuated from said axle, a clutch associated with said driving mechanism, manually operated means associated with said clutch, operating mechanism actuated from the driving mechanism, a hopper mounted in the open frame and having an inclined bottom provided with an outlet and forming a powder receptacle, an adjustable slide for controlling said outlet, an agitator mounted in said hopper and conforming to the shape thereof, a secondary agitator disposed immediately below the first named agitator and the outlet in the bottom of the hopper, a fan casing disposed in the lower portion of said hopper, a fan blower mounted in said casing. gearing for rapidly rotating said fan blower, means for driving the agitators and fan blower, distributing pipes leading from the fan casing and having nozzles disposed in proximity to the handles of the machine, and means for adjusting said tubes laterally and vertically, said means consisting of a pair of arms adjustably connected with the tubes and with the handles of the machine, the adjustable connection with the handles having a spring action.

3. A cotton duster, consisting of an open rectangular frame, a pair of handles connected with said frame, a pair of caster ground wheels mounted at the rear of said frame, a driving traction wheel mounted in the front of the frame and movable on its axle, an auxiliary hub fixed on the axle of the driving wheel, driving mechanism actuated from said axle, a clutch associated with said driving mechanism, manually operated means associated with said clutch, operating mechanism actuated from the driving mechanism, a hopper mounted in the open frame and providing a powder receptacle having an outlet, an agitator arranged in said receptacle, a secondary agitator below the outlet of the powder receptacle and driven from the shaft of the first named agitator, a fan casing below the powder receptacle, a fan in said casing, a train of gearing operated from the fan shaft to impart a rapid rotation to said fan, a pair of distributing tubes leading from the hopper adjacent the fan casing, a pair of plates secured to the handles, a pair of segmental rack plates mounted yieldingly upon said plates, a pair of rods, sliding detents carried by said rods and adapted to engage the teeth of the rack plates, and connections between the rods and distributing tubes to permit lateral and vertical adjustment of said tubes.

In testimony whereof I hereunto affix my signature.

ROBERT LEE WOODRUFF.